Nov. 13, 1951 G. J. STREZYNSKI 2,574,508
PROCESS FOR PRODUCING HEAVY CURD
Filed June 2, 1947
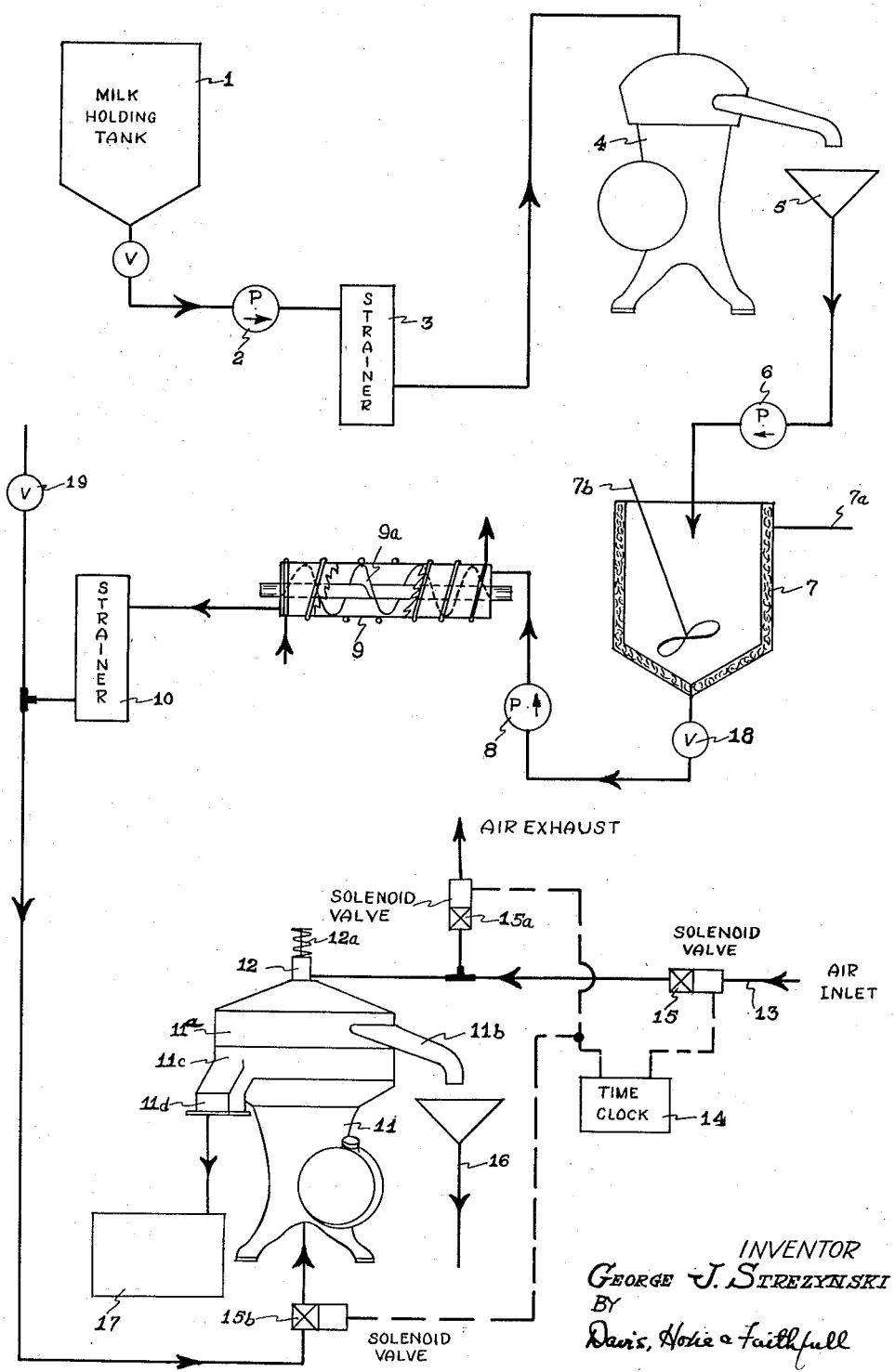
INVENTOR
GEORGE J. STREZYNSKI
BY
Davis, Hoxie & Faithfull
ATTORNEYS Patented Nov. 13, 1951

2,574,508

UNITED STATES PATENT OFFICE 2,574,508

PROCESS FOR PRODUCING HEAVY CURD

George J. Strezynski, Poughkeepsie, N. Y., assignor to The De Laval Separator Company, New York, N. Y., a corporation of New Jersey Application June 2, 1947, Serial No. 751,687

14 Claims. (Cl. 99—116)

This invention relates to the production of cheese curds and more particularly to a continuous process for producing cream cheese, Cheddar, Limburger, Camembert and similar types of whole milk cheese.

In the manufacture of various kinds of cheese from curdled milk or its equivalent, it is customary to separate the whey or serum from the curds by a conventional procedure which includes a long period of drainage, leaving a product composed mainly of butter fat and milk solids. One of the serious objections to this conventional procedure is that the prolonged time required for the separation of the whey results in physical or chemical changes, or both, which adversely affect the flavor and particularly the keeping qualities of the cheese. Moreover, the long period of drainage is objectionable from an economic standpoint, because it involves a "batch" process and requires the manufacturer to maintain a substantial investment of materials in process.

It has been proposed heretofore to separate the cheese curds from the whey by centrifugal force in place of the draining procedure. Cheese manufacturing processes utilizing centrifuges are disclosed in Salenius Patent No. 526,165, Turner Patent No. 567,522, and Link Patent No. 2,387,276. These processes have been used to some extent in the production of cheese curds which are lighter than the whey, that is, curds having a relatively high fat content. However, serious difficulties are encountered in attempting to separate relatively heavy curds from the whey by centrifugal force. One of the difficulties is to reduce the cheese mix to a condition for efficient centrifugation, without adversely affecting the curds. This pre-conditioning must provide a cheese mix in which the specific gravity of the curds is sufficiently greater than that of the whey to permit curds of the required dryness to be readily separated centrifugally.

In the Flowers and Merget Patent No. 2,514,239, there is disclosed a process which involves removing entrained gas from the curds so that they will be sufficiently heavier than the serum to make centrifugal separation relatively easy, with the curd as the heavier constituent moving toward the peripheral portion of the bowl from which it can be discharged through suitable outlets.

One object of the present invention resides in the provision of an improved centrifugal process for obtaining relatively heavy cheese curds, in which the milk product may be conditioned in a continuous or substantially continuous operation so that it can be centrifuged quickly to provide a good separation of the curds in the desired state of dryness.

Another difficulty in the centrifugal treatment of cheese mixes to obtain relatively heavy curds, is removing the curds from the centrifugal bowl where the separation occurs. As the curds should be obtained in a fairly dry condition, they have a strong tendency to become packed in the outer part of the bowl and to clog their discharge passages from the bowl.

A further object of the invention, therefore, is to provide an improved centrifugal process of the character described in which the cheese mix is so conditioned and centrifuged that the cheese curds are discharged from the bowl in the desired state of dryness without packing or clogging.

In the practice of my invention, the milk from which the cheese curds are to be derived may be skim milk or milk having a fat content approximately that of whole milk. It is important, however, that the fat content of the milk does not exceed 5%, and to this end I prefer to first standardize the milk to a fat content of less than 4.5%. The milk product, preferably standardized and having an additive curdling agent or starter, is subjected to an operation in which the milk solids are reduced to finely divided particles and dispersed uniformly in the liquid. The dispersing operation may be effected continuously by flowing a stream of the milk through an homogenizer. The resulting product is delivered to a collecting vessel or vessels where the curds are coagulated over a period of time generally in excess of one-half hour, accompanied by a mild agitation if necessary. Then, the curds are precipitated to form an acid mixture of precipitated curds as a heavier constituent and whey as a lighter constituent. This mixture is withdrawn from the lower part of the holding vessel and, at a temperature in excess of 90° F., is fed to a centrifugal separator.

In producing Liederkranz and Camembert cheeses, I prefer to omit the homogenizing and dispersing step described above, as it may have an adverse effect upon the flavor of the cheese. Instead, to avoid separation of butter fat from the milk while it is being set (during the coagulation), the holding period for the coagulation is reduced to as low as ½ hour by the use of a rapid curdling agent which accelerates the curdling process or setting, such curdling agents being well known in the art.

In the separating chamber or locus of centrifugal force, the mixture is separated into an inner annulus comprising mainly whey, and an outer annulus comprising mainly cheese curds. Separated whey from the inner annulus is discharged from the inner part of the locus of centrifugal force, while cheese curds from the outer annulus are discharged through the outer periphery of the locus in one or more streams at high speed. In this way, the curds are caused to impinge at high velocity against the inner wall of the usual stationary cover for receiving the heavier discharge, which results in a desirable working action on the curds so that they can be used without further processing. Preferably, the cheese curds are alternately accumulated in the outer part of the centrifugal locus and then discharged through the outer wall of the locus, so that the discharge of the curds is intermittent, as will be described in greater detail presently.

For a better understanding of the invention, reference may be had to the accompanying drawing illustrating schematically a system for use in practicing the process.

Referring to the drawing, the numeral 1 designates a holding tank for the milk to be processed. The milk in the tank 1 is standardized to a predetermined fat content which does not exceed 5% and is preferably less than 4.5%. The standardizing, of course, can be effected by adding cream to the whole milk or skim milk or, in case the fat content is too high, by diluting the supply with skim milk. In some instances, it may be desired to use skim milk as the source for the cheese curds, in which case the milk may first be passed through a centrifugal separator to remove butter fat.

The standardized milk is inoculated with a "starter" or curdling agent, such as rennet, as by adding the agent to the milk in the tank 1. The milk product from tank 1 is delivered, for example, by a pump 2, through a strainer 3 which removes the larger solid particles from the product. From the strainer 3, the product is fed at a substantially constant temperature, preferably somewhat about room temperature, to a homogenizer 4 where the solid particles are broken up and dispersed uniformly in the milk serum. The homogenizer 4 may be of any standard form in which the milk product is forced at high pressure, for example, 2500 pounds per square inch, through a constricted opening. I prefer, however, to use for this purpose a homogenizer of the type described in my co-pending application Serial No. 693,537, filed August 28, 1946, now Patent No. 2,572,287. In the dispersing zone of the homogenizer 4, the fat globules forming part of the milk solids are reduced to finely divided particles, and the casein and other non-fatty solids are likewise finely comminuted, the fatty and non-fatty particles being uniformly dispersed throughout the serum. The product from the homogenizer 4 is discharged into a vessel 5 and preferably subjected to a combined agitating and pumping action in an oversized centrifugal pump 6. That is, the pump 6 has a pumping capacity greatly in excess of the rate of feed through the pump, so that the "starter" and the homogenized milk product are violently agitated.

As previously described, the homogenizing operation is preferably eliminated in making Liederkranz and Camembert cheeses, as is also the case with respect to the subsequent agitation in the oversized pump 6. In other words, the mixture will be fed directly from strainer 3 with only a minimum pumping action, to the next step to be described.

The pump 6 delivers the milk product to an accumulating and holding tank 7 which, as shown, is jacketed and provided with a pipe line 7ª for introducing a heat transfer liquid into the jacket space. The milk product is fed into the upper part of the tank 7 and is held in the tank for a period sufficient to coagulate and precipitate the curds with the aid of the usual precipitation accelerating agent. The coagulation and precipitation period may be in the order of ½ to 24 hours, depending upon the nature of the "starter" and other characteristics of the mixture, it being understood that in cases where the homogenizing step is omitted, the setting period preferably does not substantially exceed one hour. Also, these characteristics of the mixture will determine the temperature at which the coagulation and precipitation is effected. That is, for some types of cheese mixes, the contents of the holding tank 7 will be heated by the liquid introduced through pipe 7ª, and for other types the liquid in the jacket will serve to cool the mix. In either event, the mixture in the tank 7, by means of the jacket and its supply pipe 7ª, may be maintained at the temperature or temperatures best suited for the ultimate cheese curd, considering the taste and other qualities desired.

Because of the low fat content of the milk product in the tank 7, and the treatment previously described, the curds are coagulated and precipitated substantially uniformly with a specific gravity well in excess of that of the whey. In some cases, however, the subsequent centrifugal separation of the curds from the whey is greatly facilitated by agitating the mixture in the tank 7, as by means of a stirrer 7ᵇ. Care should be exercised so that the agitation is a gentle one and does not introduce air into the curds or interfere with the precipitation, which should be effected under substantially quiescent conditions. In this connection, I wish to point out that in processing of cream cheese and Liederkranz and Camembert cheeses, there are actually two stages of reaction in tank 7. The first stage is that during which coagulation occurs, and the whole body of the mixture more or less jells. Then, in the second stage there is a gradual separation of whey from the curd. These periods vary greatly; that is, with Liederkranz and Camembert the total time for both stages is very short, being only about 25 minutes for Liederkranz and 1½ hours for Camembert. Therefore, the two stages of coagulation and precipitation are very close together. The agitation will then occur at the end of the precipitation period and will consist of cutting the body of the set into small lumps.

In the case of cream cheese, the total time elapsed between the start of coagulation and the end of precipitation may be as much as 24 hours. The coagulation takes place after about 4 hours, but the complete precipitation does not occur until the end of the period. In some cases, greatly improved separating or de-wheying characteristics can be obtained by very mild agitation at the time coagulation occurs, that is, about 4 hours after feeding the mix into tank 7. A second step of agitation is then necessary at the end of the setting period and before de-wheying, for the purpose of obtaining a uniform mixture and quicker centrifugal separation. This second agitation should also be mild; otherwise the dispersion will become too fine and greatly aërated.

The mixture in the tank 7 should have an acidity of about 0.9, measured in percent of lactic acid which is usually determined by titrating a measured sample of the cheese mix with a standard base and with phenolphthalein as the indicator.

The precipitated curds mixed with whey are withdrawn from the lower part of tank 7 and forced by a pump 8 through a heater 9 which, as shown, is provided with a continuously rotating scraper 9$^a$. The scraper may be in a form of a screw and serves to remove the material adhering to the walls of the heater. In this way, the solids are prevented from becoming baked on the surface of the heater and eventually clogging the same. During its flow through the heater 9, the mixture of curds and whey is heated to a temperature which will facilitate the subsequent centrifugal separation and discharge of the curds and whey. This temperature should be in excess of 90° F., and for most types of heavy cheese curds can be within the range of about 90° to 130° F. After the heating operation, the mix is fed through a strainer 10 to remove any foreign particles, such as pipe or tank scales, dried casein, etc.

The mixture from strainer 10 is fed to a centrifuge 11 having a centrifugal bowl with a peripheral outlet or outlets for the separated heavier constituent and a central outlet for the separated lighter constituent. I prefer to use a centrifugal bowl of the type disclosed in my U. S. Patent No. 2,291,117, granted July 28, 1942, in which the bowl has a series of spaced discharge nozzles in its outer periphery, and valves in the bowl for alternately opening and closing the nozzles. These discharge valves are operated by a piston mechanism 12 from a compressed air line 13. A timing mechanism 14 first opens a solenoid valve 15 to admit air to the piston mechanism 12, at the same time closing an exhaust solenoid valve 15$^a$ and closing a solenoid valve 15$^b$ in the feed line to the centrifuge. As a result, the feed is interrupted and the peripheral discharge valves in the bowl of the centrifuge are opened for a predetermined time interval, after which the clock mechanism 14 closes valve 15 and opens valves 15$^a$ and 15$^b$. The air from piston mechanism 12 is then exhausted through valve 15$^a$, whereby the spring 12$^a$ actuates the piston so as to allow the discharge valves at the periphery of the bowl to close. At the same time, the feed is resumed through valve 15$^b$.

The mixture in the bowl of centrifuge 11 is separated into an inner annulus of whey, and an outer annulus of cheese curds. The whey is discharged through the central outlet into a cover 11$^a$, from which it passes through a spout 11$^b$ into a whey discharge line 16. The separated curds in the outer annulus are discharged through the peripheral nozzles at each opening of the peripheral discharge valves. The curds pass through the nozzles at high velocity due to the high speed of rotation of the bowl, and consequently they strike the inner wall of their collecting cover 11$^c$ with a considerable force of impact which acts to "work" the curds and increase the homogeneity of the mass in the cover 11$^c$. From the latter, the curds are discharged through a spout 11$^d$ into a can 17 which is replaced when filled. It will be understood that the air rotating with the bowl within the cover 11$^c$ will act to move the mass of curds continually to the discharge spout 11$^d$. If desired, however, the interior of cover 11$^c$ may be provided with suitable stirrers or agitators, as disclosed in my Patent No. 2,291,117, for keeping the curds in motion toward the discharge spout. In either case, the movement of air in the cover 11$^c$ removes additional moisture from the curds after their impact against the cover, that is, moisture in addition to that which is removed with the separated whey constituent.

With the system as illustrated, the flow of the mixture from tank 7 to centrifuge 11 may be intermittent, because of the periodical opening and closing of feed valve 15$^b$. However, the periods during which the valve 15$^b$ is closed are of very short duration, since the separated curds will discharge very quickly when the peripheral discharge valves are opened. Accordingly, the mixture will not be held in heater 9 long enough to raise the temperature too high or to effect a burning of the curds. In each operating cycle of the valves 15, 15$^a$ and 15$^b$ (which may be in the order of 30 to 120 seconds for centrifuges of medium size, and up to 15 or 20 minutes or more for large centrifuges), a mass of curds is separated and accumulated in the separator bowl during the feed thereto, and is then quickly discharged through the peripheral outlets while the feed is stopped, the discharge period for the curds being only a small fraction of the total time for each operating cycle. In this way, the mixture treated as previously described can be readily separated in the bowl and discharged therefrom in the desired state of dryness without clogging. It is possible to obtain the curds from the spout 11$^d$ with a moisture content of only about 60%, so that the curds can be packaged without further treatment.

While I have disclosed a system in which the feed to the centrifuge 11 and the curd discharge therefrom are intermittent, it is to be understood that the valves 15, 15$^a$ and 15$^b$ and the peripheral discharge valves in the bowl may be omitted, so that the feed and discharge are continuous.

When skim milk is used as the starting material in the tank 1, it may be found that the curds from the spout 11$^d$ do not have the desired fat content. In such cases, butter fat may be added to the curds in the can 17, as by mixing cream with the same.

The centrifuge 11 may be cleaned at desired intervals by shutting off the flow from tank 7, as by means of a valve 18, and admitting hot water to the centrifuge through a valve 19.

I claim:

1. In the treatment of milk products containing milk solids suspended in serum, to obtain cheese curds, the process which comprises feeding the milk product in a continuous stream through a solids dispersing zone in which the milk solids are reduced to fine particles and dispersed substantially uniformly in the serum, accumulating a body of the dispersed milk solids and serum along with a starter in a holding space wherein the fat content of the milk product is less than 5%, coagulating the curds in said space, subjecting the body to mild agitation in said space followed by a period of holding under quiescent conditions, to form an acid mixture of precipitated curds as a heavier constituent and whey as a lighter constituent, withdrawing a mixture of curds and whey from the lower part of said space and feeding the same to a locus of centrifugal force at a temperature in excess of 90° F., separating the mixture in said locus into an inner annulus of whey and an outer annulus of curds, continuously discharging whey from said locus from the inner annulus therein, discharging curds from said outer annulus through the outer wall of the locus at high speed, and impacting the discharging curds by suddenly changing their velocity.

2. The process as defined in claim 1, in which the dispersed milk solids and liquid from said zone are continuously fed into the holding space near the top thereof, the mixture of precipitated curds and whey being withdrawn from the holding space near the bottom thereof and then fed to said locus of centrifugal force.

3. The process as defined in claim 1, in which curds from said outer annulus are discharged intermittently in closely confined jets through the outer wall of the locus.

4. The process as defined in claim 1, in which curds from said outer annulus are discharged periodically through the outer wall of the locus, the period of each discharge being a small fraction of the elapsed time between successive discharges.

5. The process as defined in claim 1, comprising also the step of heating said mixture to said temperature, after precipitation of the curds but before feeding the mixture to the locus of centrifugal force.

6. The process as defined in claim 1, comprising also the step of adding a precipitation accelerating agent to the milk product before said dispersing operation, to facilitate the subsequent precipitation of the curds.

7. The process as defined in claim 1, comprising also the step of straining the mixture of precipitated curds and whey before feeding the same to the locus of centrifugal force.

8. The process as defined in claim 1, comprising also the step of standardizing the milk product, before feeding the same through said dispersing zone, to a fat content of less than 5%.

9. The process as defined in claim 1, comprising also the steps of standardizing the milk product, before feeding the same through said dispersing zone, to a fat content less than 5%, and adding a starter to the standardized milk product before feeding the same through said zone.

10. The process as defined in claim 1, in which the acidity of said mixture fed to the locus of centrifugal force is maintained at about 0.9 percent of lactic acid.

11. The process as defined in claim 1, comprising also the steps of standardizing the milk product, before feeding the same through said dispersing zone, to a fat content of less than 3%, and adding butter fat to the curds discharged from said locus.

12. In the treatment of milk products containing milk solids suspended in serum, to obtain cheese curds, the process which comprises standardizing the milk product to a fat content of less than 5% and adding thereto a starter, feeding the resulting product in a continuous stream through a solids dispersing zone in which the milk solids are reduced to fine particles and uniformly dispersed in the serum, subjecting the product stream from said zone to a combined agitating and pumping action and then feeding the product to an accumulating and holding space, precipitating the curds in said space to form a mixture of precipitated curds and whey having an acidity of about 0.9 percent of lactic acid, withdrawing a mixture of curds and whey from near the bottom of said space and flowing a stream of the same through a heating zone to a locus of centrifugal force, heating the flowing stream in the heating zone to a temperature of about 90° to 130° F. while subjecting the heating zone to a continuous scraping action, separating the heated mixture in said locus into an inner annulus of whey and an outer annulus of curds, discharging whey from said locus from the inner annulus therein, discharging curds from said outer annulus at high speed through the outer periphery of the locus, and impacting the discharging curds by suddenly changing their velocity.

13. In the production of cheese curds, the process which comprises accumulating in a holding space a batch of standardized milk having a fat content less than 5 percent, and a starter, coagulating the curds while subjecting the mixture in said space to mild agitation, precipitating the coagulated curds while maintaining the mixture quiescent, to thereby form a mixture of precipitated curds and whey, feeding said mixture at a temperature in excess of about 90° F. to a locus of centrifugal force and there separating it into an inner annulus of whey and an outer annulus of curds, discharging whey from the locus from said inner annulus, discharging curds from said outer annulus at high speed through the periphery of the locus in a closely confined stream, and impacting the discharging curds by suddenly changing their velocity.

14. In the production of cheese curds, the process which comprises accumulating in a holding space a batch of standardized milk having a fat content less than 5 percent, and a starter, holding the batch in said space to cause coagulation of the curds, subjecting the material in said space to a mild agitation upon coagulation of the curds, then stopping the agitation and allowing the curds to precipitate, thereby forming a mixture of precipitated curds and whey, subjecting said mixture to a second mild agitation, feeding said mixture at a temperature in excess of about 90° F. to a locus of centrifugal force and there separating it into an inner annulus of whey and an outer annulus of curds, discharging whey from the locus from said inner annulus, discharging curds from said outer annulus at high speed through the periphery of the locus in a closely confined stream, and impacting the discharging curds by suddenly changing their velocity.

GEORGE J. STREZYNSKI.

REFERENCES CITED

The following references are of record in the file of this patent:

UNITED STATES PATENTS

| Number | Name | Date |
|---|---|---|
| 526,165 | Salenius | Sept. 18, 1894 |
| 567,522 | Turner | Sept. 8, 1896 |
| 1,475,398 | Kielsmeir | Nov. 27, 1923 |
| 1,578,820 | Gere | Mar. 30, 1926 |
| 1,661,601 | Dahlberg | Mar. 6, 1928 |
| 1,868,547 | Stevenson | July 26, 1932 |
| 2,160,159 | Lindstedt | May 30, 1939 |
| 2,387,276 | Link | Oct. 23, 1945 |
| 2,415,239 | Flowers et al. | Feb. 4, 1947 |

FOREIGN PATENTS

| Number | Country | Date |
|---|---|---|
| 2,445 | Great Britain | June 23, 1877 |
| 4,869 | Great Britain | Dec. 22, 1877 |
| 165,398 | Great Britain | May 18, 1922 |